United States Patent
Liang

(10) Patent No.: US 9,207,677 B2
(45) Date of Patent: Dec. 8, 2015

(54) VEHICLE POSITIONING METHOD AND ITS SYSTEM

(71) Applicant: AUTOMOTIVE RESEARCH & TESTING CENTER, Lugang Chen, Changhua Hsien (TW)

(72) Inventor: Chih-Neng Liang, Changhua Hsien (TW)

(73) Assignee: AUTOMOTIVE RESEARCH & TESTING CENTER, Lugang Chen, Changhua Hsien (TW)

( * ) Notice: Subject to any disclaimer, the term of this patent is extended or adjusted under 35 U.S.C. 154(b) by 67 days.

(21) Appl. No.: 14/146,040

(22) Filed: Jan. 2, 2014

(65) Prior Publication Data

US 2015/0185735 A1    Jul. 2, 2015

(51) Int. Cl.
*G01C 21/00* (2006.01)
*G05D 1/02* (2006.01)
*G06K 9/00* (2006.01)

(52) U.S. Cl.
CPC .......... *G05D 1/0234* (2013.01); *G06K 9/00671* (2013.01); *G06K 9/00791* (2013.01)

(58) Field of Classification Search
CPC .... G05D 1/0234; G06K 9/00; B60T 2201/10; G01C 21/3602; G01C 21/3647
USPC ................ 701/1, 523, 41, 42; 340/435, 932.2
See application file for complete search history.

(56) References Cited

U.S. PATENT DOCUMENTS

| | | | |
|---|---|---|---|
| 6,950,035 B2 * | 9/2005 | Tanaka et al. | 340/932.2 |
| 2006/0271278 A1 * | 11/2006 | Sakakibara et al. | 701/207 |
| 2007/0112490 A1 * | 5/2007 | Mizusawa | 701/36 |
| 2009/0303027 A1 * | 12/2009 | Nagamine et al. | 340/435 |
| 2010/0066515 A1 * | 3/2010 | Shimazaki et al. | 340/435 |
| 2011/0025529 A1 * | 2/2011 | Uechi et al. | 340/905 |
| 2011/0121068 A1 * | 5/2011 | Emanuel et al. | 235/375 |
| 2014/0186050 A1 * | 7/2014 | Oshima et al. | 398/118 |

FOREIGN PATENT DOCUMENTS

TW    I359259    3/2012

* cited by examiner

*Primary Examiner* — Tuan C. To
*Assistant Examiner* — Shardul Patel
(74) *Attorney, Agent, or Firm* — patenttm.us

(57) ABSTRACT

A vehicle positioning method and its system are disclosed. The vehicle positioning method has a camera adapted to be mounted in front of a vehicle, multiple visible marks mounted in a photographing-available range of a camera, and a vehicle positioning system. Each visible mark contains a position information related to a location of the visible mark. The vehicle positioning system receives an image of the visible mark captured from the camera and image-processes the image to read the position information of the captured visible mark. The vehicle positioning system further calculates a distance between the captured visible mark and the vehicle and then further corrects the position information of the captured visible mark to have GPS coordinates of the vehicle.

10 Claims, 5 Drawing Sheets

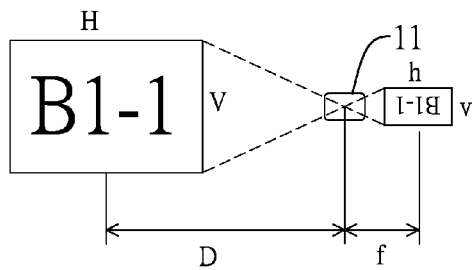
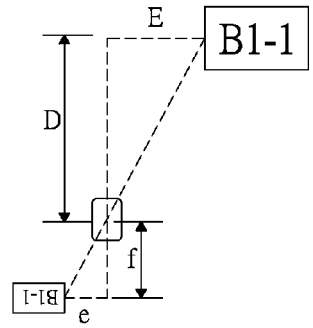
FIG. 5A  FIG. 5B
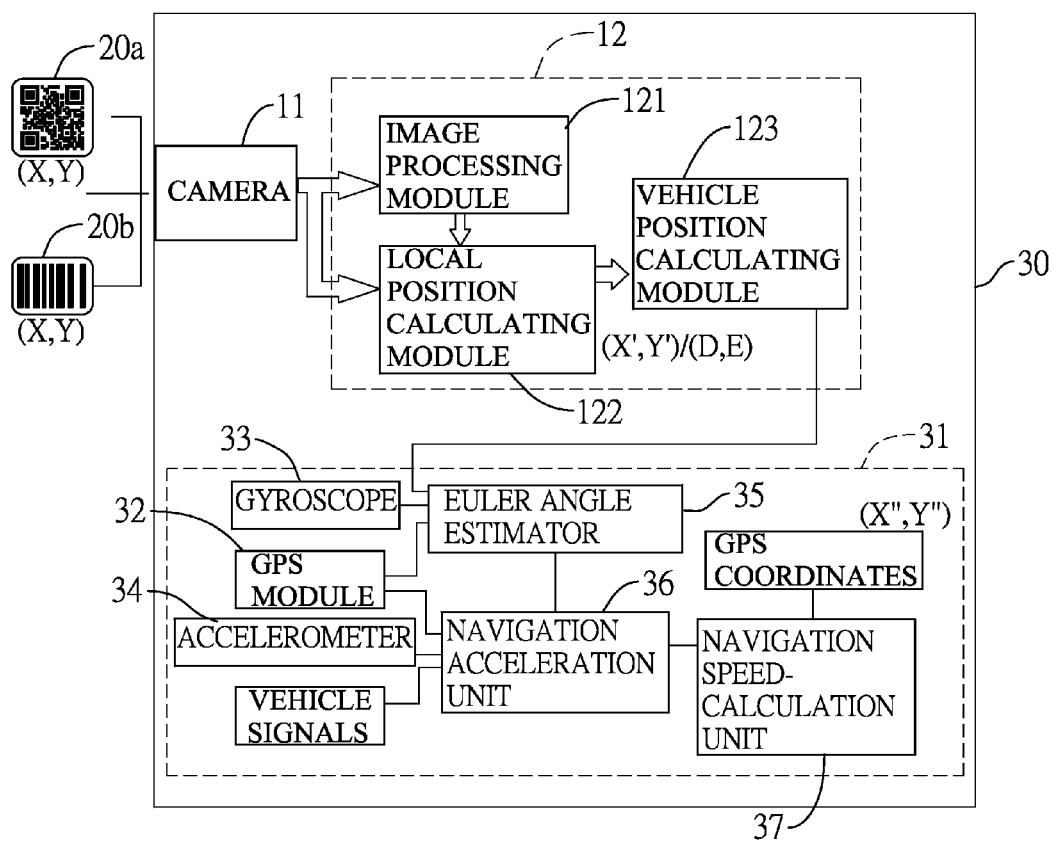
FIG. 6

VEHICLE POSITIONING METHOD AND ITS SYSTEM

BACKGROUND OF THE INVENTION

1. Field of the Invention

The present invention relates to a vehicle positioning method and its system, especially to a vehicle positioning method and its system being used under the environment without Global Positioning System (hereinafter GPS) signals or with weak GPS signals.

2. Description of Related Art

In general, a conventional vehicle positioning system is a GPS navigation system 50. With reference to FIG. 7, the GPS navigation system 50 has a GPS module 52 and an IMU (Inertial Measurement Unit) module (not numbered). The GPS Module 52 receives positioning information from multiple satellites, and the positioning information comprises driving data including at least longitude, latitude, direction, and speed of the vehicle on which the GPS module 52 is mounted. The IMU module has a gyroscope 51, an accelerometer 53, an Euler angle estimator 54, a navigation acceleration unit 55, and a navigation speed-calculation unit 56, so the IMU module outputs current vehicle inertial data including driving direction, speed and so on. The final GPS coordinates of the vehicle are decided by the GPS navigation system 50 according to the positioning information of the GPS module 52 and the vehicle inertial data from the IMU module. For example, the GPS navigation system 50 uses the driving direction and speed from the IMU module and corrects the direction and speed from the GPS module 52.

The GPS module 52 cannot provide the available driving data when the vehicle is located at the environment without GPS signals or with weak GPS signals, such as a location under a bridge or in the building. Although the GPS navigation system 50 may obtain a last available driving data before the vehicle is driving into the building and cooperates with the vehicle inertial data from the IMU module to generate the GPS coordinates, inaccurate GPS coordinates may be calculated since the sensing errors of the IMU module are accumulated.

US patent publication No. 20110121068, which is incorporated as referenced herein, discloses a method and apparatus for determining position and rotational orientation of an object. With reference to FIG. 8, the apparatus has multiple barcode marks 61, multiple reference position patterns 60 and multiple cameras 62. Each barcode mark 61 has a unique ID. Each camera 62 is mounted on a corresponding moveable object. The reference position patterns 60 are mounted on a ceiling of an indoor space in which the moveable objects are moving. The reference position patterns 60 are arranged in multiple crossed lines. The barcode marks 61 are mounted on the reference position patterns 60 and are arranged in a matrix. When one moveable object is moving into the indoor space, the camera 62 of the moveable object captures the reference position patterns 60 and at least one of the barcode marks 61 thereon. Then, the 2D axes and the ID of the captured barcode mark 61 are obtained. The current position of the moveable object is determined according to the 2D axes and the ID of the captured barcode mark 61, so that the moveable object can be controlled to move along a preset path inside the indoor space.

The above-mentioned conventional apparatus can determine a current position of the moveable object in the indoor space, but the conventional apparatus is only applied for the object moving along a preset path indoors. Therefore, the reference patterns 60 and the barcode marks 61 have to be fixed on the ceiling. The coordinates of the object are calculated by a relationship of the reference patterns 60 and the barcode marks 61 to further position the object. However, the coordinates system is only applied to a specific area. Again, the conventional apparatus can provide the movable position information, but the movable position information cannot be used as the position information of the GPS navigation system or a cruise control system. Therefore, the positioning accuracy of the GPS navigation system or the cruise control system used in the environment without GPS signals or having weak GPS signals has to be improved.

SUMMARY OF THE INVENTION

The main objective of the present invention is to provide a positioning method and system to increase the positioning accuracy when the vehicle is located in the environment without GPS signals or having weak GPS signals.

The positioning method of the present invention has the following steps of:

(a) mounting multiple visible marks in a photographing-available range of a camera mounted in front of one vehicle, wherein each visible mark contains a position information related to a location of the visible mark;

(b) capturing one of the visible marks;

(c) image-processing the captured visible mark to read the position information thereof, and calculating a distance between the captured visible mark and the vehicle; and (d) calculating GPS coordinates of the vehicle according to the position information of the captured visible mark and the distance.

The positioning system of the present invention has a camera adapted to be mounted in front of a vehicle, multiple visible marks mounted in a photographing-available range of a camera, and a vehicle positioning device adapted to be mounted inside the vehicle and electronically connected to the camera. Each visible mark contains a position information related to a location of the visible mark. The vehicle positioning device further has an image processing module, a local position calculating module, and a vehicle position calculating module. The image processing module receives an image of the visible mark captured from the camera and image-processes the image to read the position information of the captured visible mark. The local position calculating module is electronically connected to the image processing module and the camera to obtain the image and the position information of the captured visible mark. The local position calculating module calculates a distance between the captured visible mark and the vehicle and then outputs the position information of the captured visible mark and the distance to the vehicle position calculating module. The vehicle position calculating module further corrects the position information of the captured visible mark to have GPS coordinates of the vehicle.

Other objectives, advantages and novel features of the invention will become more apparent from the following detailed description when taken in conjunction with the accompanying drawings.

BRIEF DESCRIPTION OF THE DRAWINGS

FIGS. 5A and 5B are schematic diagrams of calculating a distance between the visible mark and the vehicle;

FIG. 6 is a functional block diagram of a GPS navigation system in accordance with the present invention;

DETAILED DESCRIPTION OF THE PREFERRED EMBODIMENT

The present invention determines GPS coordinates of a vehicle when the vehicle is located in an environment without GPS signals or having weak GPS signals. In addition, the present invention may also integrate with a GPS navigation system or a cruise control system.

Figure 1:
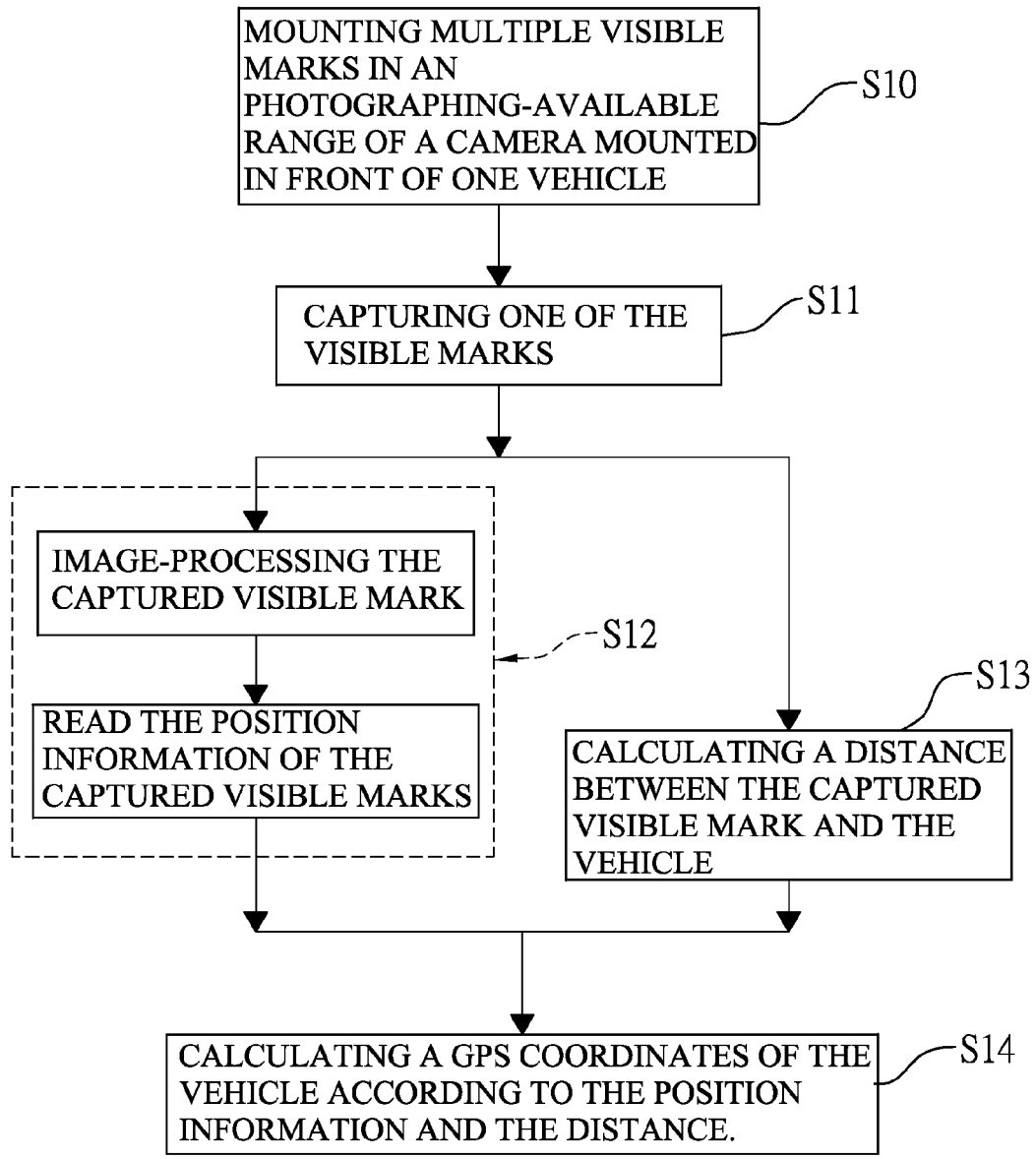
FIG. 1 is a flow chart of a vehicle positioning method in accordance with the present invention.

With reference to FIG. 1, a vehicle positioning method in accordance with the present invention has the following steps of:

(a) mounting multiple visible marks 20 in a photographing-available range of a camera 11 mounted in front of one vehicle, wherein each visible mark 20 contains a position information related to a location of the visible mark; wherein the position information includes at least absolute coordinates, for example, longitude and latitude (S10);

(b) capturing one of the visible marks 20 (S11);

(c) image-processing the captured visible mark to read the position information thereof (S12), and calculating a distance between the captured visible mark 20 and the vehicle (S13); and (d) calculating GPS coordinates of the vehicle according to the position information of the captured visible mark and the distance (S14).

Figure 2:
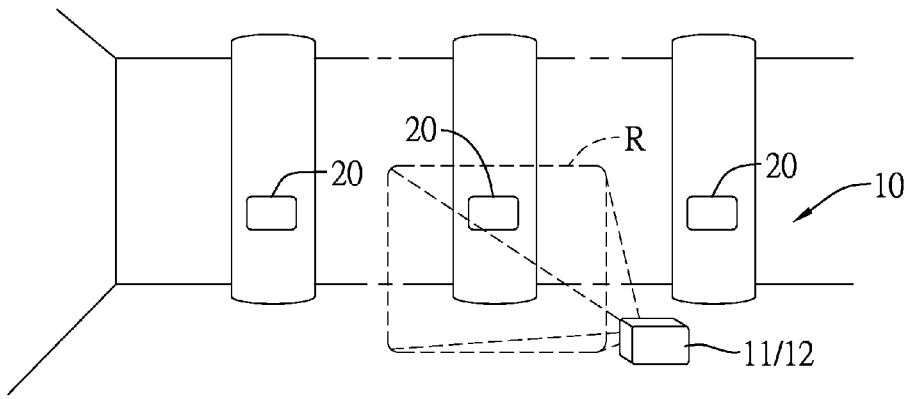
FIG. 2 is a schematic diagram of a vehicle positioning system in accordance with the present invention.
Figure 4A:
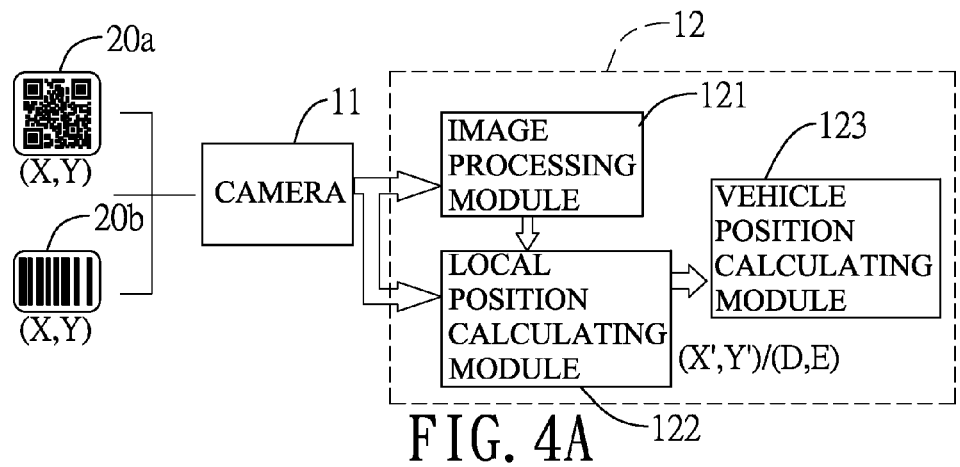
FIG. 4A is a functional block diagram of a first embodiment of the vehicle positioning system in accordance with the present invention.
Figure 4B:
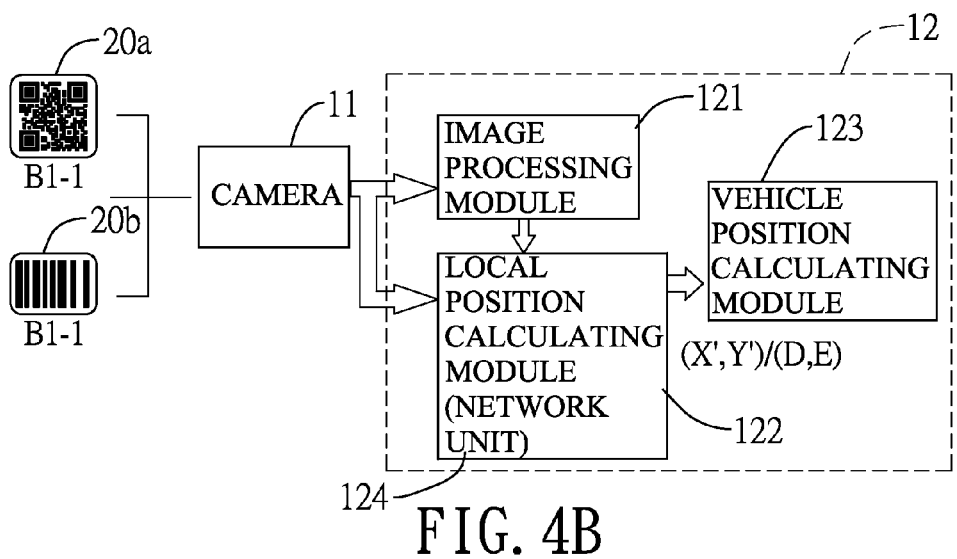
FIG. 4B is a functional block diagram of a second embodiment of the vehicle positioning system in accordance with the present invention.
Figure 4C:
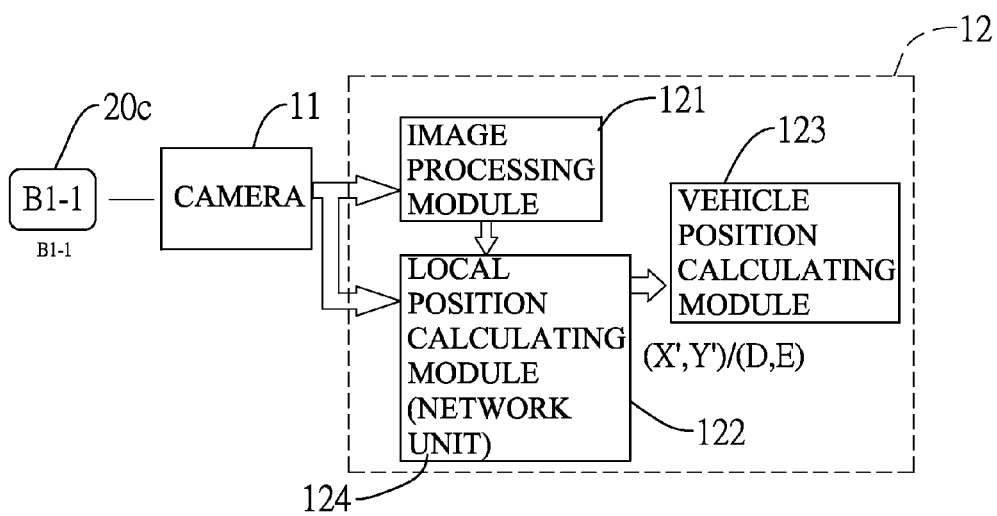
FIG. 4C is a functional block diagram of a third embodiment of the vehicle positioning system in accordance with the present invention.
Figure 7:
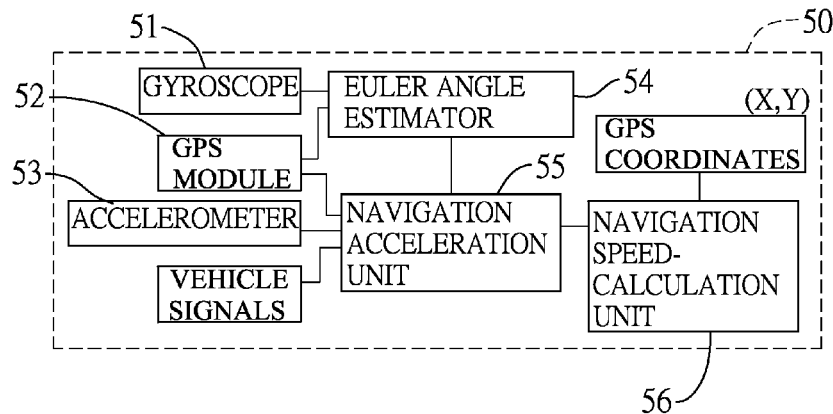
FIG. 7 is a conventional GPS navigation system in accordance with the prior art.
Figure 8:
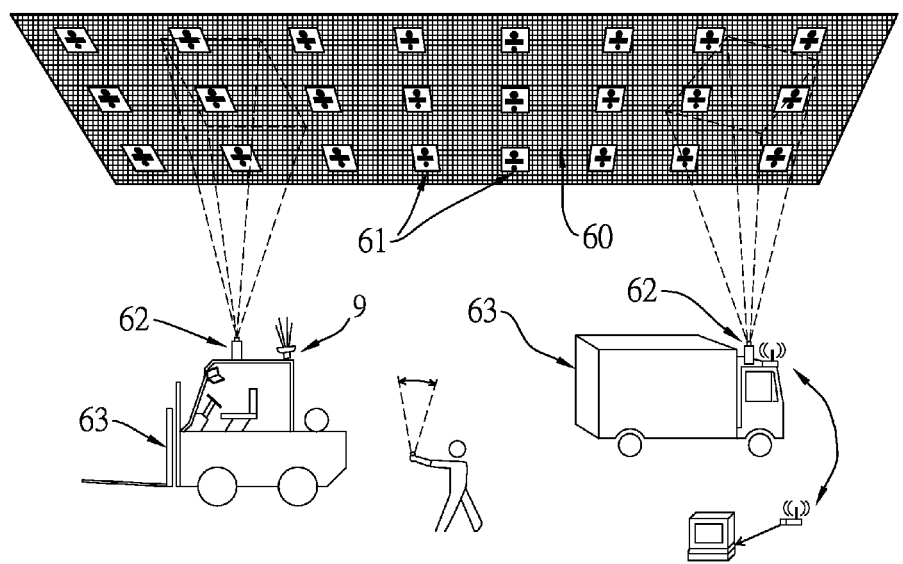
FIG. 8 is a schematic diagram of a conventional positioning apparatus.

With further reference to FIG. 2, an indoor parking lot 10 is taken as an example. The visible marks 20 are mounted on the walls or on pillars, and a height from ground to each visible mark mounted on the wall or pillar is within the photographing-available range R of a camera 11 mounted in front of one vehicle. With further reference to FIGS. 4A to 4C, each visible mark 20 may be a barcode, a quick response code (hereinafter QR code), or a unique pattern inside the indoor parking lot. The position information can be directly encoded and generated to the barcode or the QR code. An identification (ID) related to position information may be also encoded and generated to the barcode or QR code.

When the vehicle drives into the indoor parking lot, as shown in FIG. 2, the camera 11 thereon will capture one of the visible marks 20 inside the indoor parking lot. Since each visible mark 20 contains the position information related to the location of the visible mark 20, the captured visible mark can be further image-processed to obtain the position information $(X, Y, \phi)$ of the location of the captured visible mark. The $(X, Y)$ is GPS coordinates and the $\phi$ is a direction which is parallel with a driving direction from the vehicle to the captured visible mark. However, the position information does not include the real GPS coordinates of the vehicle. The distance (D,E) between the captured visible mark and the vehicle has to be further calculated and the GPS coordinates $(X, Y)$ of the captured visible mark are corrected to calculate the real GPS coordinates $(X', Y')$ of the vehicle according to the distance.

Figure 3:
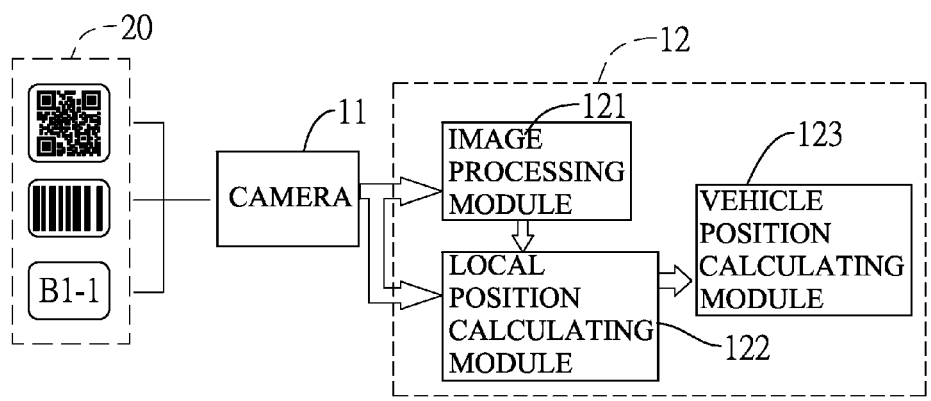
FIG. 3 is a functional block diagram of the vehicle positioning system in accordance with the present invention.

With reference to FIG. 3 the vehicle positioning system has multiple visible marks 20 for being mounted on an indoor space, a camera 11 and a vehicle positioning device 12 electronically connected to the camera 11.

The vehicle positioning device 12 has an image processing module 121, a local position calculating module 122, and a vehicle position calculating module 123.

The image processing module 121 is electronically connected to the camera 11 and receives an image of the captured visible mark. The image processing module 121 image-processes the image to obtain the position information contained in the captured visible mark 20.

The local position calculating module 122 is electronically connected to the image processing module 121 and the camera 11 to receive the image and the position information of the captured visible mark 20. The local position calculating module 122 calculates a distance between the vehicle and the captured visible mark 20 according to the image, and then outputs the distance and the position information of the captured visible mark.

The vehicle position calculating module 123 is electronically connected to the local position calculating module 122 and receives the position information of the captured visible mark and the distance. The vehicle position calculating module 123 corrects the position information according to the distance and then obtains the real GPS coordinates of the vehicle.

Multiple embodiments of obtaining the vehicle GPS coordinates by the local position calculating module 122 are further described. With reference to FIG. 4A, each visible mark is a barcode 20b or a QR code 20a. The position information is directly encoded to the barcode or QR code. The image processing module 121 decodes the barcode 20b and the QR code 20a to obtain the position information. With reference to FIG. 4C, each visible mark 20 is a pattern 20c showing an ID number. The image processing module 121 also image-processes the pattern to identify the ID number related to a position information, and then uses the ID number to read the related position information. When the image processing module 121 obtains the position information, the position information is output to the local position calculating module 122. At the time, the local position calculating module 122 also receives the image of the captured visible mark 20. Since the vehicle positioning device 12 is mounted inside the vehicle, the local position calculating module 122 calculates a distance (D, E) between the captured visible mark 20 and the vehicle according to the size of the image and 2D coordinates of the image. The local position calculating module 122 outputs the distance to the vehicle position calculating module 123. The distance includes a first distance D and a second distance E. With further reference to FIG. 5A, the first distance D is calculated according to an equation (1): $D=\sqrt{HV \times (f^2/hv)}$, wherein "H" represents a length of the visible mark, "V" represents a width of the visible mark, "h" represents a length of the captured visible mark on the image, "v" represents a width of the captured visible mark on the image, and "f" represents an image distance. The second distance E is calculated according to an equation (2): $E=fD/e$, wherein "E" represents a distance between the visible mark and a center of the vehicle, "e" represents a distance between the image and the center of the vehicle, and "f" represents an image distance.

Based on the foregoing description, the vehicle position calculating module obtains the position information of the visible mark and the distance between the visible mark and the vehicle. The vehicle position calculating module can correct the position information of the visible mark according to the distance to further calculate real GPS coordinates of the vehicle.

With reference to FIG. 4B, a unique ID or a wireless network address related to the position information is directly encoded to a barcode 20b or QR code 20a. The image processing module 121 decodes the barcode 20b and the QR code 20a to obtain the ID and then uses the ID or the wireless network address to read the related position information. In this embodiment, the vehicle positioning system pre-stores a look-up table including IDs and position information each of which is corresponding to one of the IDs. When the image processing module 121 outputs the ID to the local position calculating module 122, the local position calculating module 122 reads the look-up table and then compares the look-up table with the ID from the image processing module 121 to obtain the position information corresponding to the ID. To implement and pre-store the look-up table in the local position calculating module 122, the local position calculating module 122 can further electronically connect to a wireless network unit 124, such as Wi-Fi or Bluetooth. When the vehicle is driving into the indoor parking lot, the wireless network unit 124 links to a local server of the indoor parking lot and downloads the look-up table previously stored in the local server. In addition, the local position calculating module 122 directly obtains the position information from the local server, when the local position calculating module 122 links to the local server through the wireless network address.

With reference to FIG. 4C, if the visible mark 20 is a pattern showing the ID number, the image processing module 121 can identify the ID number by image-processing the image of the captured visible mark 20. Since the local position calculating module 122 is electronically connected to the wireless network unit 124, the ID from the image processing module 121 is sent to the local server of the indoor parking lot and waits for a response from the local server. The local server previously stores a comparison table including the IDs and the position information, so the local server reads one of the position information from the comparison table according to the ID sent from the local position calculating module 122. The local server sends the response including the position information to the local position calculating module 122.

Based on the foregoing description, the vehicle positioning system obtains real GPS coordinates of the vehicle in the indoor parking lot without GPS signals or having weak GPS signals according to the visible marks in the indoor parking lot. In addition, with reference to FIG. 6, a vehicle navigation system 30 is shown and has the vehicle positioning system and a GPS navigation device 31. The GPS navigation device 31 has a GPS module 32 and an IMU module electronically connected to the GPS module 32 and the vehicle position calculating module 123 of the vehicle positioning system. The IMU module has a gyroscope 33, an accelerometer 34, an Euler angle estimator 35, a navigation acceleration unit 36, and a navigation speed-calculation unit 37.

When the vehicle is driving in the indoor parking lot, the GPS module does not output GPS coordinates since the GPS module does not receive the GPS signals. Therefore, the vehicle positioning system provides the GPS coordinates to the IMU module. Since the IMU module obtains the real GPS coordinates, the sensing errors of the IMU module can be prevented.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A vehicle positioning method, comprising steps of:
   (a) mounting multiple visible marks in a photographing-available range of a camera mounted in front of one vehicle, wherein each visible mark contains a position information related to a location of the visible mark;
   (b) capturing one of the visible marks;
   (c) image-processing the captured visible mark to read the position information thereof, and calculating a distance between the captured visible mark and the vehicle;
   (d) calculating GPS coordinates of the vehicle according to the position information of the captured visible mark and the distance; and
   wherein, the distance includes a first distance D and a second distance E calculated by following equations:
   (1) $D=\sqrt{HV \times (f^2/hv)}$ wherein "H" is a length of the visible mark, "V" is a width of the visible mark, "h" represents a length of the captured visible mark on the image, "v" represents a width of the captured visible mark on the image, and "f" represents an image distance; and
   (2) $E=fD/e$, wherein "E" represents a distance between the visible mark and a center of the vehicle, "e" represents a distance between the image and the center of the vehicle, and "f" represents the image distance.

2. The method as claimed in claim 1, wherein
   in the step (a), each visible mark is a barcode or a QR code and the position information is encoded therein; and
   in the step (c), the position information is directly obtained from the captured visible mark.

3. The method as claimed in claim 1, wherein
   in the step (a), each visible mark is a barcode or a QR code and a unique identification (ID) related to the position information is encoded therein; and
   in the step (c), a look-up table is further prepared, the ID is directly obtained from the captured visible mark, and the position information of the captured visible mark is further read from the look-up table according to the ID, wherein the look-up table includes the IDs and the position information of the visible marks.

4. The method as claimed in claim 1, wherein
   in the step (a), each visible mark is a barcode or a QR code and a network address is encoded therein; and
   in the step (c), the network address is directly obtained from the captured visible mark, and the position information of the captured visible mark stored in a local server is wirelessly downloaded by linking to the network address.

5. The method as claimed in claim 1, wherein
   in the step (a), each visible mark is a pattern showing an ID number; and
   in the step (c), the ID number is directly obtained from the captured visible mark, and the position information of the captured visible mark is wirelessly downloaded from a local server by sending the ID number to the local server.

6. A vehicle positioning system, comprising:

a camera mounted in front of a vehicle;

multiple visible marks, each of which is mounted within an available range of the camera and contains a position information related to a location of the visible mark; and a vehicle positioning device mounted inside the vehicle and electronically connected to the camera and having:

an image processing module electronically connected to the camera to receive an image of the visible mark captured by the camera and image-processing the image to read the position information of the captured visible mark;

a local position calculating module electronically connected to the image processing module and the camera to obtain the image and the position information of the captured visible mark to calculate a distance between the captured visible mark and the vehicle, and then outputting the position information of the captured visible mark and the distance;

a vehicle position calculating module electronically connected to the local position calculating module to receive the distance and the position information of the captured visible mark, wherein the vehicle position calculating module corrects the position information of the captured visible mark to have GPS coordinates of the vehicle; and wherein, the distance includes a first distance D and a second distance E calculated by following equations:

(1) $D=\sqrt{HV\times(f^2/hv)}$ wherein "H" is a length of the visible mark, "V" is a width of the visible mark, "h" represents a length of the captured visible mark on the image, "v" represents a width of the captured visible mark on the image, and "f" represents an image distance; and (2) $E=fD/e$, wherein "E" represents a distance between the visible mark and a center of the vehicle, "e" represents a distance between the image and the center of the vehicle, and "f" represents the image distance.

7. The system as claimed in claim 6, wherein the visible mark is a barcode or a QR code and the position information is encoded therein; and the image processing module directly decodes the captured visible mark to obtain the position information of the captured visible mark.

8. The system as claimed in claim 6, wherein the visible mark is a barcode or a QR code and an identification (ID) is encoded therein, wherein the ID is related to a corresponding position information;

the image processing module directly decodes the captured visible mark to obtain the ID; and the local position calculating module previously stores a look-up table including the IDs and the position information, so the position information corresponding to the ID is obtained from the look-up table after the local position calculating module receives the ID from the image processing module.

9. The system as claimed in claim 6, wherein the visible mark is a barcode or a QR code and a wireless network address is encoded therein, wherein the wireless network address is used to link to a local server;

the image processing module directly decodes the captured visible mark to obtain the wireless network address, wherein the image processing module outputs the wireless network address to the local position calculating module; and the local position calculating module is electronically connected to a wireless network unit to link to the local server according to the wireless network address to obtain the position information corresponding to the captured visible mark.

10. The system as claimed in claim 6, wherein the visible mark is a pattern showing an ID number;

the image processing module directly decodes the captured visible mark to obtain the ID number, wherein the image processing module outputs the ID number to the local position calculating module; and the local position calculating module is electronically connected to a wireless network unit to link to a local server and sends the ID number to the local server to obtain the position information corresponding to the ID number from the local server.

* * * * *